(12) United States Patent
Kirita

(10) Patent No.: US 7,508,542 B2
(45) Date of Patent: Mar. 24, 2009

(54) IMAGE FORMING DEVICE AND IMAGE FORMING METHOD

(75) Inventor: Hiroshi Kirita, Otsu (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 1138 days.

(21) Appl. No.: 10/804,910

(22) Filed: Mar. 19, 2004

(65) Prior Publication Data

US 2004/0252177 A1 Dec. 16, 2004

(30) Foreign Application Priority Data

Jun. 11, 2003 (JP) .............................. 2003-165942

(51) Int. Cl.
G06F 15/00 (2006.01)

(52) U.S. Cl. ........................................ 358/1.9; 358/3.1

(58) Field of Classification Search .................. 358/1.9, 358/3.1; 708/300–303, 444, 503, 490; 347/171
See application file for complete search history.

(56) References Cited

U.S. PATENT DOCUMENTS

| | | | | |
|---|---|---|---|---|
| 4,887,224 A | * | 12/1989 | Okano et al. ................. | 345/555 |
| 4,953,013 A | * | 8/1990 | Tsuji et al. .................. | 358/530 |
| 5,774,167 A | * | 6/1998 | Hara .......................... | 347/254 |
| 6,002,433 A | * | 12/1999 | Watanabe et al. ........... | 348/246 |
| 6,292,205 B1 | | 9/2001 | Nakayasu et al. | |
| 6,356,291 B1 | | 3/2002 | Ernst | |
| 6,603,496 B2 | | 8/2003 | Nagumo et al. | |
| 2002/0075372 A1 | | 6/2002 | Nagumo et al. | |
| 2004/0233717 A1 | * | 11/2004 | Morikawa et al. ...... | 365/185.11 |

FOREIGN PATENT DOCUMENTS

| | | |
|---|---|---|
| EP | 1 018 834 A2 | 7/2000 |
| EP | 1 174 824 | 1/2002 |
| JP | 10-276333 | 10/1998 |
| JP | 2000141741 A | 5/2000 |
| JP | 2000198233 A | 7/2000 |
| JP | 2002205425 A | 7/2002 |
| JP | 2002-232771 | 8/2002 |

OTHER PUBLICATIONS

Japanese language office action and its English translation for corresponding Japanese application No. 2003-165942 lists the references above, 2007.

European search report for corresponding European application No. 04012270.7-1228 lists the references above, 2007.

* cited by examiner

*Primary Examiner*—Kimberly A Williams
(74) *Attorney, Agent, or Firm*—Hogan & Hartson LLP

(57) ABSTRACT

An image forming device includes a plurality of holding units that holds data of pixels around a target pixel, a weight generating unit that generates a weight for each holding unit, a plurality of weight applying units that applies a corresponding weight to the data held by each holding unit, and a control unit that determines an exposing energy for the target pixel in accordance with an output of each weight applying unit.

18 Claims, 5 Drawing Sheets

FIG. 5

| ADDITIONAL VALUE | DUTY RATIO |
|---|---|
| 12 | 25% |
| 11 | 25% |
| 10 | 25% |
| 9 | 50% |
| 8 | 50% |
| 7 | 50% |
| 6 | 75% |
| 5 | 75% |
| 4 | 100% |
| 3 | 100% |
| 2 | 100% |
| 1 | 100% |

IMAGE FORMING DEVICE AND IMAGE FORMING METHOD

BACKGROUND OF THE INVENTION

1. Field of the Invention

The present invention relates to an image forming device such as a copy machine, a facsimile machine and a printer, and an image forming method.

2. Description of the Related Art

In a conventional laser printer known as an image forming device, when an electrostatic latent image is formed on a photoconductive body by using 100% light energy even on an inner part of a black solid part of the image, a large amount of toner adheres to the photoconductive body. Not only is the toner consumed in a large amount, but there is also a drawback of deterioration in the quality of the image recorded on paper, such as trailing of the toner. In consideration of such a drawback, by using a matrix of pixels, depending on whether surrounding pixels are white or black, a determination can be made as to whether a target pixel is located at a peripheral part or at an inner part of the black solid part. An exposing energy for pixels located in the black solid part is reduced in order to reduce an amount of toner adhered to the photoconductive body. This technology is generally known as "Toner Saving".

In the above-described technology, by using the matrix of pixels consisting of the target pixel and the surrounding pixels, depending on whether the surrounding pixels are white or black, a determination can be made as to whether or not to reduce the light energy of the target pixel. In fact, a value of the surrounding pixels is arranged in one piece of data and this piece of data is input to a memory as an address. The exposing energy is reduced in accordance with this piece of data output from the memory. That is, the toner is saved for the target pixel.

However, since it becomes necessary to provide a memory, the scale of the circuitry increases. In particular, to improve accuracy for determining whether the target pixel is located at the peripheral part or at the inner part of the black solid part, the size of the matrix increases and a greater capacity of the memory becomes necessary. Meanwhile, when image data becomes multilevel, the number of bits of data as the address increases and a greater capacity of memory becomes necessary.

SUMMARY OF THE INVENTION

An advantage of the present invention is to provide an image forming device and an image forming method which can determine whether or not to save toner for a target pixel by simple circuitry.

According to an aspect of the present invention, the image forming device includes a plurality of holding units that holds data of pixels around a target pixel, a weight generating unit that generates a weight for each holding unit, a plurality of weight applying units that applies a corresponding weight to the data held by each holding unit, and a control unit that determines an exposing energy for the target pixel in accordance with an output of each weight applying unit.

In the present invention, the weight applying unit is a multiplier that multiplies the data and the weight. The control unit includes an adder that adds the output of each weight applying unit. The control unit can compare the output of the adder with one or more reference and determine the exposing energy for the photoconductive body. Depending on how the weight is applied, a sense of direction can be given to saving of an edge.

BRIEF DESCRIPTION OF THE DRAWINGS

FIG. 5 is a table for describing selection of a signal of different duty ratios in the controller of the exposing energy in the image processing circuit for the printer.

DETAILED DESCRIPTION OF THE PREFERRED EMBODIMENTS

Figure 1:
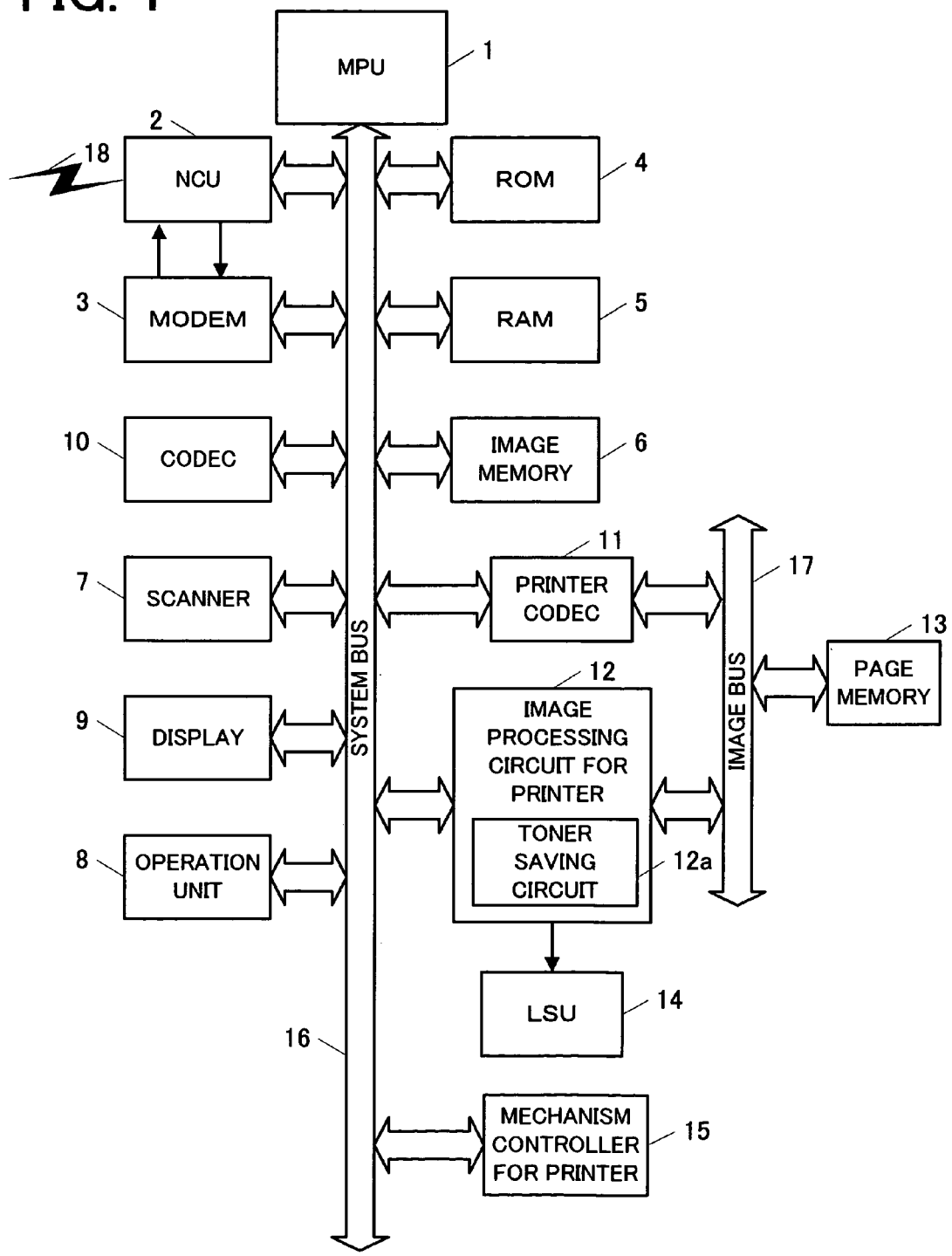
FIG. 1 is a block diagram showing a configuration of a Multi-Function Peripheral (MFP) according to an embodiment of the present invention.

Embodiments of the present invention will be described. FIG. 1 shows a configuration of a MFP (including multi-functions such as a copy function, a facsimile function and a scanning function) according to an embodiment of the present invention.

The MFP includes a Micro Processor Unit (MPU) 1, a Network Control Unit (NCU) 2, a MODEM 3, a Read Only Memory (ROM) 4, a Random Access Memory (RAM) 5, an image memory 6, a scanner (image scanning unit) 7, an operation unit 8, a display 9, a Coder and Decoder (CODEC) 10, a printer CODEC 11, an image processing circuit for a printer 12, a page memory 13, a Laser Scan Unit (LSU) 14, a mechanism controller for a printer 15, a system bus 16 and an image bus 17.

The MPU 1 includes a function for controlling the entire MFP in accordance with a program stored in the ROM 4. The NCU 2 and the MODEM 3 are connected to the MPU 1. The NCU 2 is controlled by the MPU 1. The NCU 2 controls a connection between a communication line 18 and the MFP. The NCU 2 includes a function for transmitting a dial pulse according to a telephone number of another party of a communication, and a function for detecting a ring signal. Further, the communication line 18 is connected to a Public Switched Telephone Network (PSTN).

The MODEM 3 modulates transmission data and demodulates received data. Specifically, the MODEM 3 modulates the transmission data which is a digital signal, into an analog audio frequency signal. Then, the MODEM 3 transmits the analog audio frequency signal to the communication line 18 via the NCU 2. The MODEM 3 also demodulates into a digital signal, an analog audio frequency signal received from the communication line 18 via the NCU 2. The ROM 4 stores in advance, programs or the like for controlling an operation of the entire MFP. For example, the RAM 5 stores data necessary for the control by the MPU 1 and data necessary to be stored temporarily. The image memory 6 stores image data scanned by the scanner 7 and also stores image data received from a remote device via the communication line 18 and the MODEM 3.

The scanner 7 scans a shading plate or an image of an original document and converts the scanned data into an electric signal. The scanner 7 executes various processes on image data scanned by a Charge Coupled Device (CCD) line image sensor.

The operation unit 8 includes a start key, a mode switching key for switching modes between a copy mode and a facsimile mode or the like, a ten-key numeric pad for inputting numbers such as a telephone number, a speed dial key, and keys for instructing various operations. The display 9 displays various pieces of information such as a telephone number input from the operation unit 8 and a remaining amount of toner of the printer.

The CODEC 10 encodes the image data scanned from the original document and the stored image data in accordance with Modified Huffman (MH), Modified Read (MR) and Modified MR (MMR) schemes or the like for transmitting the image data. The printer CODEC 11 decodes the encoded image data for printing the received image data and the data scanned from the original document.

The image processing circuit for the printer 12 controls image processing when printing the received image data, the scanned image data or the like. The image processing circuit for the printer 12 includes a toner saving circuit 12a. The page memory 13 stores the image data to be printed. The LSU 14 controls a printing operation of a laser printer in accordance with a signal from the image processing circuit for the printer 12. The mechanism controller for the printer 15 controls supplying, transporting, etc. of paper to the printer.

Figure 2:
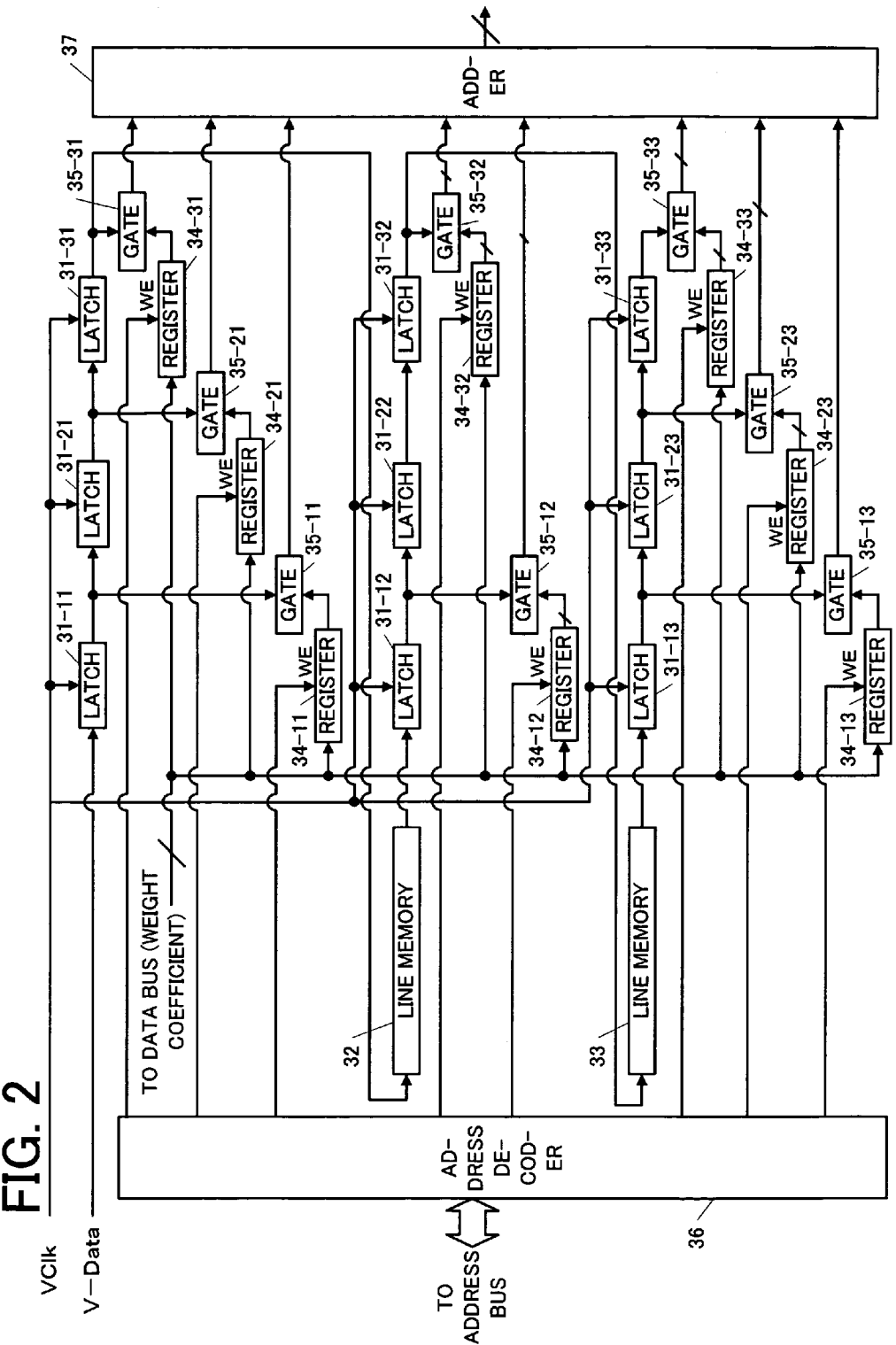
FIG. 2 is a block diagram showing an accumulator for pixel data in an image processing circuit for a printer of the MFP.
Figure 3:
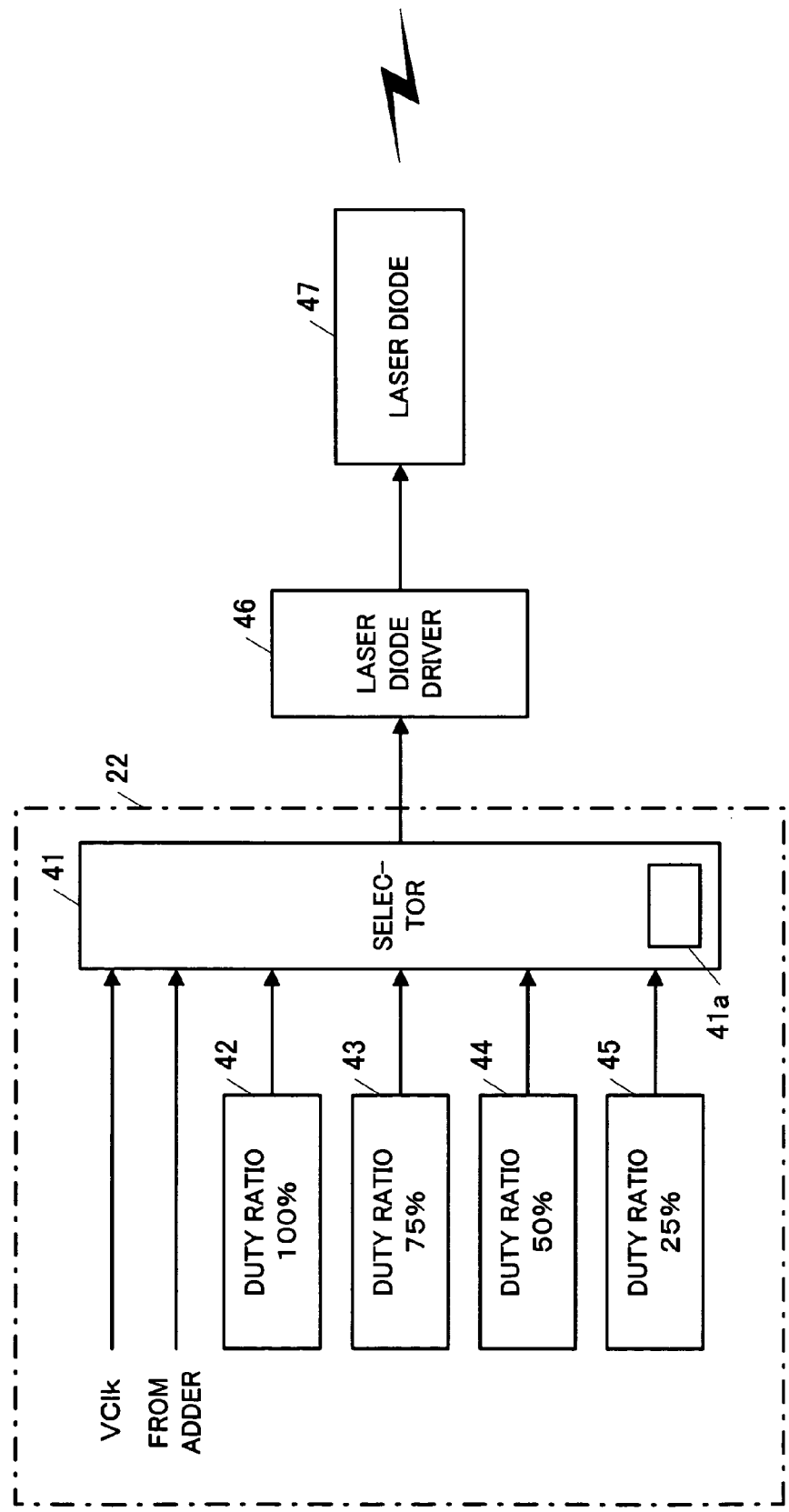
FIG. 3 is a block diagram showing an exposing energy controller in the image processing circuit for the printer of the MFP.

The toner saving circuit 12a consists of an accumulator 21 that accumulates data of surrounding pixels for the target pixel shown in FIG. 2, and an exposing energy controller 22 shown in FIG. 3. The data accumulator 21 shown in FIG. 2 is made of the following circuits (i)-(vii):

(i) Latches 31-11, 31-21 and 31-31 which store for each pixel, image data V-Data that is input serially, and a line memory 32 which stores image data for one line output from the latch 31-31, (ii) Latches 31-12, 31-22 and 31-32 which store for each pixel, the stored data of the line memory 32 input serially, (iii) A line memory 33 which stores image data for one line output from the latch 31-32, and latches 31-13, 31-23, . . . and 31-33 which store for each pixel, the stored data of the line memory 33 input serially, (iv) Registers 34-11, 34-21, . . . and 34-33 which are provided for each of the latches 31-11, 31-21, . . . and 31-33 (excluding 31-22) respectively, and store a weight coefficient of each of the surrounding pixels, (v) Gate circuits 35-11, 35-21, . . . and 35-33 which are provided for each of the latches 31-11, 31-21, . . . and 31-33 (excluding 31-22) respectively, and when a stored value of the corresponding latch is "1", derive an output of the corresponding register, (vi) An address decoder 36 which applies a selection signal to each of the registers 34-11, 34-21, . . . and 34-33, and (vii) An adder 37 which adds after receiving each output from the gate circuits 35-11, 35-21, . . . and 35-33.

The address decoder 36 is used when storing the weight coefficient in each of the registers 34-11, 34-21, . . . and 34-33. The MPU 1 selects one of the registers 34-11, 34-21, . . . and 34-33 by outputting an address to the address decoder 36, and writes in the weight coefficient to the selected register. This process is normally carried out when power is turned on or when starting a print job.

Figure 4:
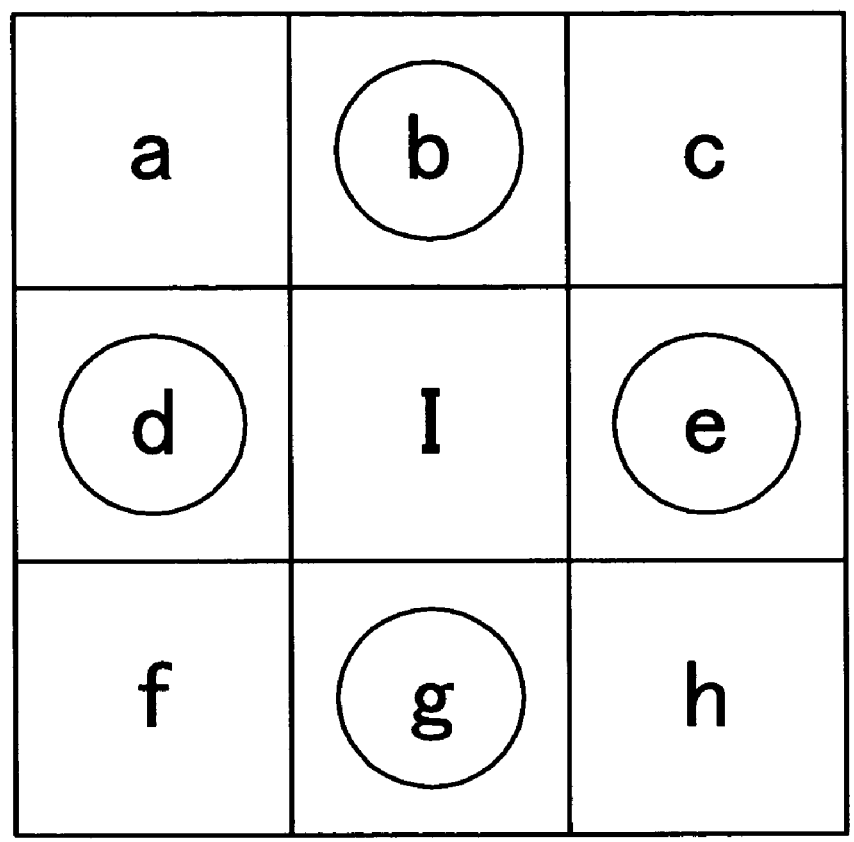
FIG. 4 is a flow diagram for describing data accumulation with respect to surrounding pixels of a target pixel in the accumulator of the pixel data in the image processing circuit for the printer.

Suppose that in the pixels of a 3×3 matrix shown in FIG. 4, pixel data of a target pixel I is input to the data accumulator 21. Further, the weight coefficient for pixels (b), (d), (e) and (g) that are adjacent vertically and horizontally to the target pixel I is 2, and the weight coefficient for pixels (a), (c), (j) and (h) in a diagonal direction is 1.

For example, when each of pixels Va, Vb, . . . and Vh of the input image data V-Data has a value of "1", "1" is stored in each of the latches 31-11, 31-21, . . . and 31-33. Therefore, all of the gate circuits 35-11, 35-21, . . . and 35-33 are at an opened state. The value "2" is output from each of the registers 34-21, 34-12, 34-32 and 34-23 and the value "1" is output from each of the registers 34-11, 34-21, 34-13 and 34-33. The outputs are input to the accumulator 35, and an additional value of 12 is output.

As another example, among the input image data V-Data, when the pixels Va, Vd, Vf and Vg have a value of "0" and the other pixels Vb, Vc, Ve and Vh have a value of "1", "1" is stored in the latches 31-21, 31-31, 31-32 and 31-33. Accordingly, only the gate circuits 35-21, 35-31, 35-32 and 35-33 are opened. The value "2" is output from each of the registers 34-21 and 34-23 via the gate circuits 35-21 and 35-23 respectively, a value of "1" is output from each of the registers 34-31 and 34-33 via the gate circuits 35-31 and 35-33 respectively, and an additional value of 6 is output from the adder 37.

As another example, among the input image data V-Data, when the pixels Va and Vf have a value of "1" and thus the pixels Vb, Vc, Vd, Ve, Vg and Vh have a value of "0", "1" is stored in each of the latches 31-11 and 34-13, and only the gate circuits 35-11 and 35-13 are opened. The value of "1" is output from each of the registers 34-11 and 34-13 respectively and an additional value of 2 is output from the adder 37.

As shown in FIG. 3, the exposing energy controller 22 includes a selector 41 that receives an input of an additional value output from the adder 37 and outputs a duty ratio signal according to the additional value, a duty ratio 100% signal generator 42, a duty ratio 75% signal generator 43, a duty ratio 50% signal generator 44 and a duty ratio 25% signal generator 45. The selector 41 includes a storage unit 41a of a lookup table that associates an output value of the adder 37 with a duty ratio to be selected (refer to FIG. 5). The selector 41 selects a duty ratio signal according to the output value (additional value) of the adder 37.

When the additional value is 12 as in the above-described example of the output of the data accumulator 21, the selector 41 selects and outputs a signal of the duty ratio 25% signal. The duty ratio 25% signal is applied to a laser diode driver 46, and a laser diode 47 is driven by the signal. In this case, the target pixel corresponds to the black solid region of the image, the toner is saved for the target pixel and the image is printed.

When the additional value of 6 is input to the selector 41, the duty ratio 75% signal is selected and output. In this case, the target pixel having a meaning of an edge enhancement is printed. When the additional value of 2 is input to the selector 41, the duty ratio 100% signal is selected and output.

Further, in the above-described embodiment, each pixel of the image data is binary data. However, the present invention can be applied even when each pixel is multilevel data. In case the image data is multilevel, a multiplier can be used in place of each of the gates 35-11, 35-12, . . . and 35-33 shown in FIG. 2. Furthermore, when the weight coefficient is 2, the multiplier can be exchanged with a bit shift circuit. Even when the image data is binary data, if the weight coefficient can be a fixed value, the weight coefficient can be set by a wired-logic when designing the circuit. As a result, the registers and the address decoder become unnecessary and the circuitry can be simplified even more.

What is claimed is:

1. An image forming device, comprising:
 a plurality of holding units that holds data of pixels around a target pixel;
 a weight generating unit that generates a weight for each holding unit;
 a plurality of weight applying units that applies a corresponding weight to the data held by each holding unit, wherein the weight generating unit is a register that stores the weight and the register is provided to each holding unit; and a control unit that determines an exposing energy for the target pixel in accordance with an output of each weight applying unit.

2. The image forming device according to claim 1, wherein each weight applying unit is a multiplier that multiplies the data and the weight, and the control unit includes an adder that adds the output of each weight applying unit and compares an additional value of the adder with one or more reference to determine the exposing energy.

3. The image forming device according to claim 1, further comprising:

a microprocessor unit; and an address decoder that decodes an address output from the microprocessor unit and designates each register, wherein the register designated by the address decoder stores weight data output by the microprocessor unit.

4. The image forming device according to claim 1, further comprising a laser scan unit that exposes the target pixel on a photoconductive body by the determined exposing energy.

5. The image forming device according to claim 4, wherein a duty ratio of a signal output from the control unit controls the exposing energy of the laser scan unit.

6. The image forming device according to claim 5, wherein the control unit includes a signal generator that generates signals of a plurality of different duty ratios, and in accordance with a determination result, selects one of the signals output from the signal generator.

7. An image forming device, comprising:

means for holding data of pixels around a target pixel;

means for generating a weight for image data around the target pixel, wherein the means for generating a weight is a means for storing the weight in a register and is provided for each of the means for holding;

means for applying a corresponding weight to the data held by each means for holding; and means for determining an exposing energy for the target pixel in accordance with an output of each means for generating a weight.

8. The image forming device according to claim 7, wherein the means for applying a corresponding weight multiplies the data and the weight, and the means for determining adds the output of each means for applying a weight and compares an additional value with one or more reference to determine the exposing energy.

9. The image forming device according to claim 7, further comprising:

means for outputting an address and a weight corresponding to the address;

means for selecting one of the means for holding a weight in accordance with the address; and means for holding a weight corresponding to the address by the selected means for holding a weight.

10. The image forming device according to claim 7, further comprising means for laser scanning to expose the target pixel on a photoconductive body by the determined exposing energy.

11. The image forming device according to claim 10, wherein the means for determining determines the exposing energy by a duty ratio of a signal.

12. The image forming device according to claim 11, wherein one signal is selected from signals of a plurality of different duty ratios and the exposing energy is determined.

13. An image forming method comprising:

extracting data of pixels around a target pixel;

holding the extracted data of pixels around a target pixel in a holding unit;

generating a weight for each extracted data;

storing the generated weight in a register different from the holding unit;

applying the weight to each extracted data;

adding the data applied with the weight; and determining an exposing energy for the target pixel in accordance with an additional value.

14. The image forming method according to claim 13, further comprising:

designating the register;

writing the weight into the designated register; and retrieving the weight from the register.

15. The image forming method according to claim 13, further comprising outputting to a laser scanner unit, a signal of duty ratio according to the determined exposing energy.

16. The image forming method according to claim 15, further comprising selecting a signal according to the determined exposing energy from signals of a plurality of different duty ratios.

17. The image forming method according to claim 16, further comprising selecting a signal according to the determined exposing energy from the signals of the plurality of duty ratios from a lockup table.

18. The image forming method according to claim 13, further comprising determining an exposing energy corresponding to the additional value by referencing a lookup table.

* * * * *